(12) United States Patent
Balinsky et al.

(10) Patent No.: US 9,652,477 B2
(45) Date of Patent: May 16, 2017

(54) DETERMINING PROBABILITY THAT AN OBJECT BELONGS TO A TOPIC USING SAMPLE ITEMS SELECTED FROM OBJECT AND PROBABILITY DISTRIBUTION PROFILE OF THE TOPIC

(75) Inventors: Helen Balinsky, Cardiff (GB); Steven J. Simske, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 849 days.

(21) Appl. No.: 13/259,216

(22) PCT Filed: Oct. 31, 2009

(86) PCT No.: PCT/US2009/062904
§ 371 (c)(1),
(2), (4) Date: Sep. 23, 2011

(87) PCT Pub. No.: WO2011/053325
PCT Pub. Date: May 5, 2011

(65) Prior Publication Data
US 2012/0233110 A1    Sep. 13, 2012

(51) Int. Cl.
*G06F 17/30* (2006.01)

(52) U.S. Cl.
CPC .................. *G06F 17/3028* (2013.01)

(58) Field of Classification Search
CPC ........ G06N 99/005; G06N 5/048; G06N 5/04; G06N 7/005; G06N 7/02; G06N 7/06; G06F 9/44

USPC ......................... 706/52, 46, 45, 62
See application file for complete search history.

(56) References Cited

U.S. PATENT DOCUMENTS

| 6,125,362 | A | 9/2000 | Elworthy |
| 6,611,825 | B1* | 8/2003 | Billheimer et al. ............ 706/45 |
| 7,792,850 | B1* | 9/2010 | Raffill et al. .................. 707/758 |
| 2002/0138478 | A1* | 9/2002 | Schwartz et al. ................. 707/3 |
| 2004/0111438 | A1 | 6/2004 | Chitrapura et al. |
| 2006/0059121 | A1* | 3/2006 | Zhang et al. ..................... 707/3 |
| 2008/0101689 | A1 | 5/2008 | Forman |
| 2008/0170767 | A1 | 7/2008 | Yfantis |
| 2009/0210369 | A1* | 8/2009 | Shao et al. ...................... 706/21 |

OTHER PUBLICATIONS

Kleinberg, J., et al.; "Using Mixture Models for Collaborative Filtering"; Jun. 13-15, 2004; 10 pages.
Simske, S. J., et al; "Meta-Algorithm Systems for Document"; Oct. 10-13, 2006; 9 pages.

* cited by examiner

*Primary Examiner* — Stanley K Hill
*Assistant Examiner* — Ilya Traktovenko
(74) *Attorney, Agent, or Firm* — Michael A. Dryja

(57) ABSTRACT

An object potentially belongs to a number of topics. Each topic is characterized by a probability distribution profile of a number of representative items that belong to the topic. Sample items are selected from the object, less than a total number of items of the object. A probability that the object belongs to each topic is determined using the probability distribution profile characterizing each topic and the sample items selected from the object.

19 Claims, 4 Drawing Sheets

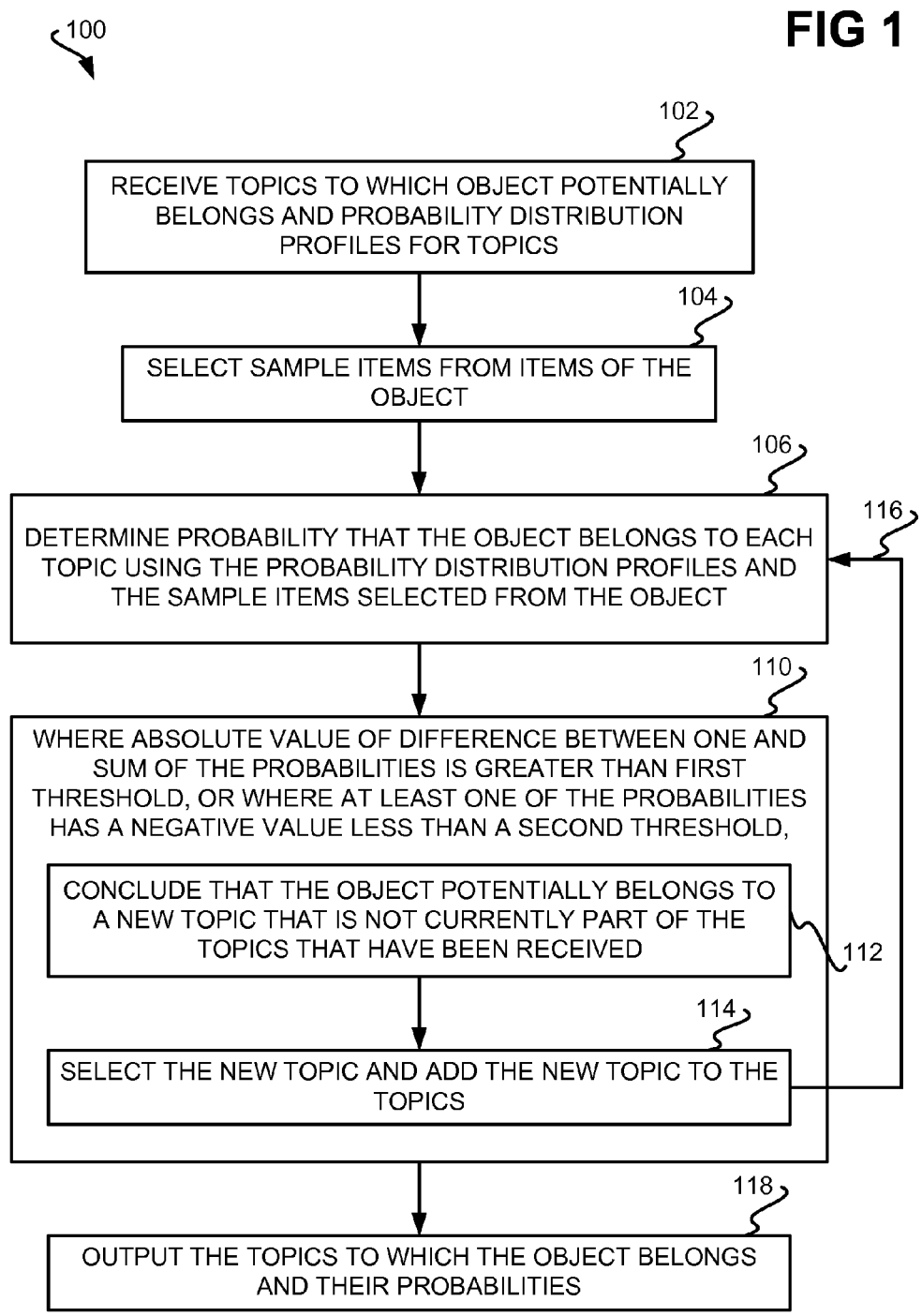

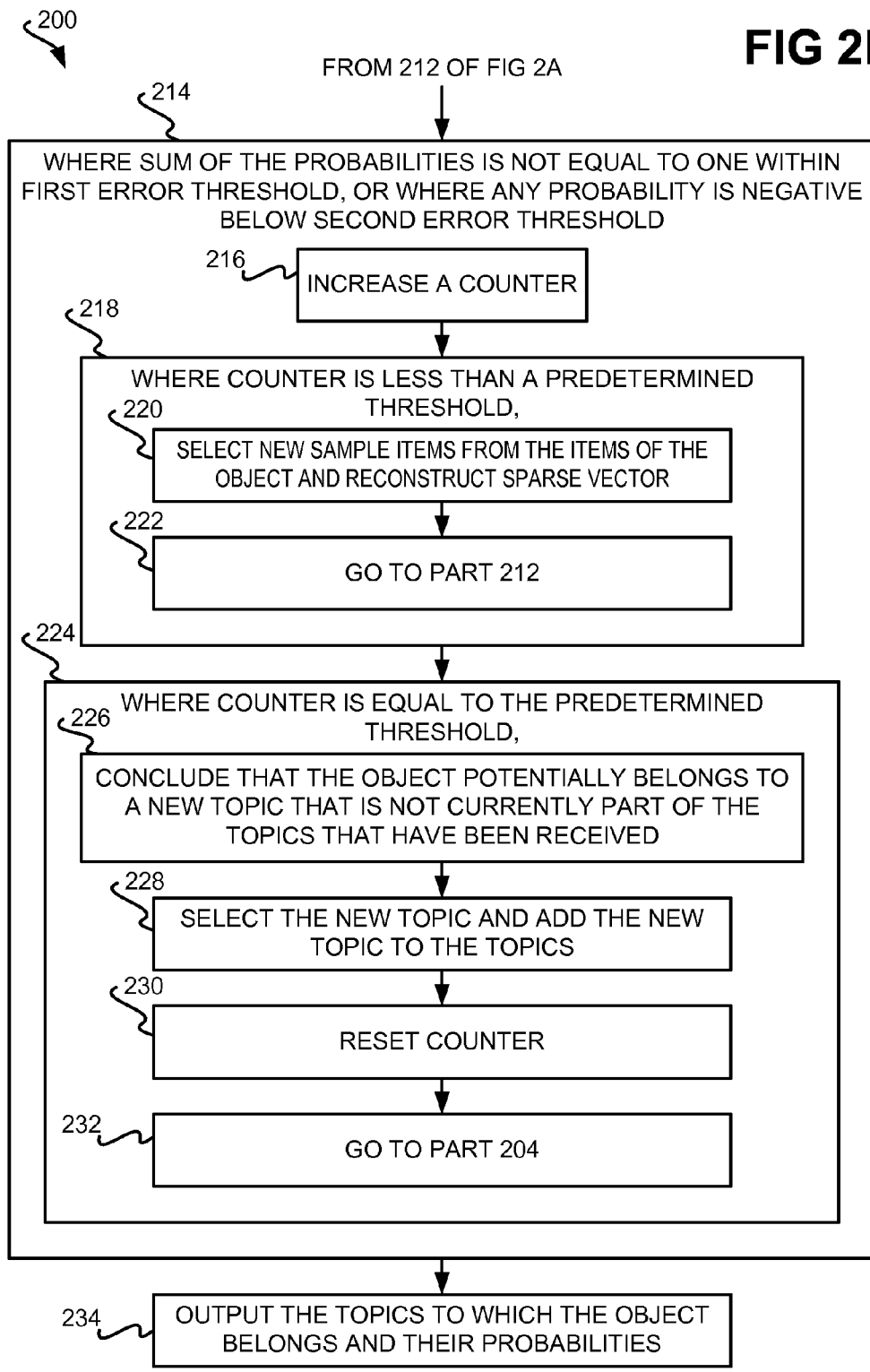

DETERMINING PROBABILITY THAT AN OBJECT BELONGS TO A TOPIC USING SAMPLE ITEMS SELECTED FROM OBJECT AND PROBABILITY DISTRIBUTION PROFILE OF THE TOPIC

BACKGROUND

A classifier determines the topic or topics to which a given object belongs. For example, an object may be a digital image, a number of printed pages that have been scanned, a text document, or another type of object. The topics to which such an object belongs to may be different types of items found in a digital image, the number of different scan jobs encompassing printed pages that have been scanned, the different types of subject matter to which a text document relates, or other types of topics. A classifier analyzes an object against the topics to determine the topic or topics to which the object belongs.

BRIEF DESCRIPTION OF THE DRAWINGS

FIG. 1 is a flowchart of a method, according to an embodiment of the present disclosure.

FIGS. 2A and 2B are flowcharts of a method that is more detailed than but consistent with the method of FIG. 1, according to an embodiment of the present disclosure.

DETAILED DESCRIPTION

Figure 2A:
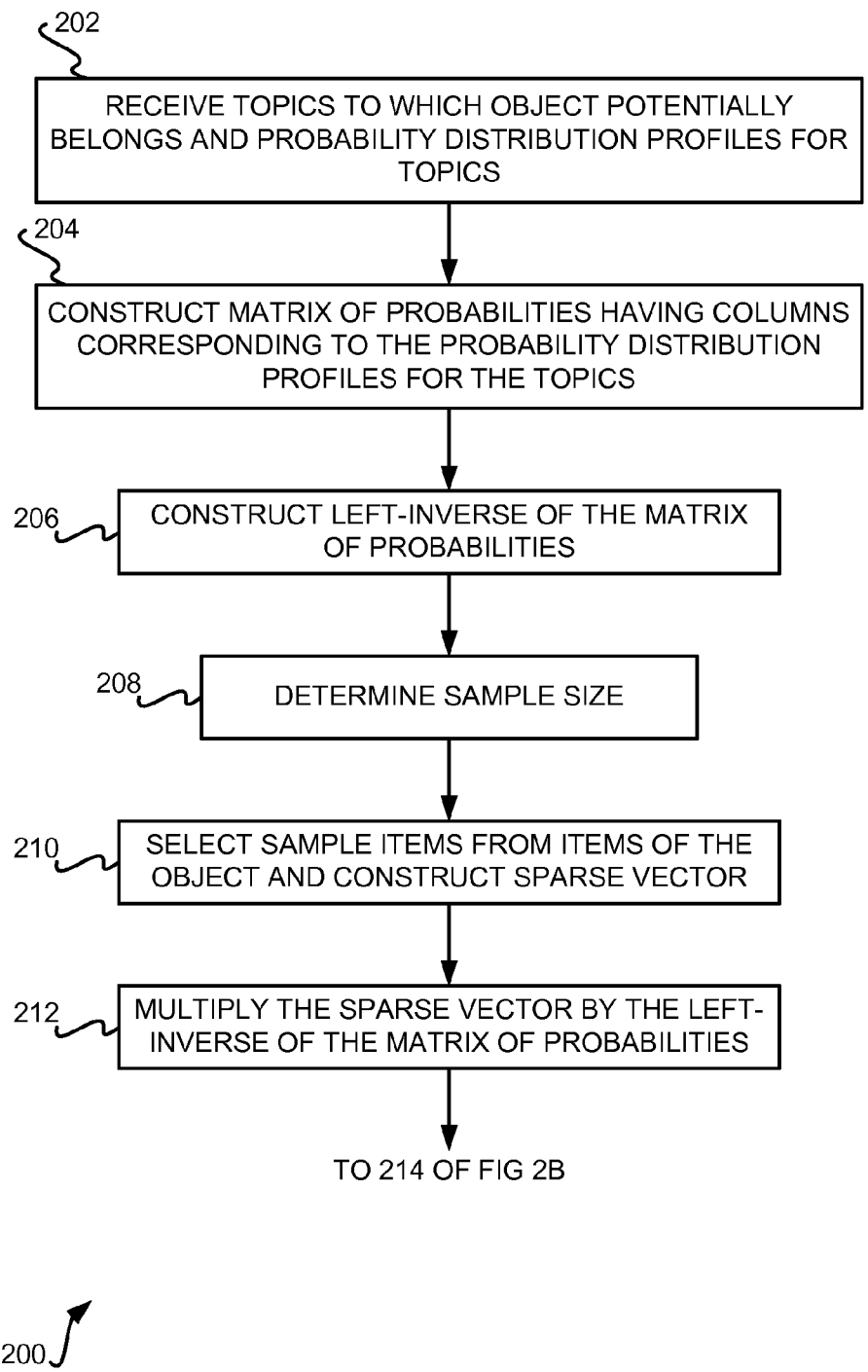

As noted in the background section, a classifier analyzes an object against a number of topics to determine the topic or topics to which the object belongs. For example, an object may be a digital image of a picture of the sky, clouds, and mountains, where there are more mountains than sky in the picture, and more sky than clouds in the picture. The predefined set of topics to which the object potentially belongs may include clouds, mountains, and cars, but not sky.

In one type of prior art classifier, the object is determined as belonging to the topic of the predefined set of topics that is most prevalent within the object. In the example, the object is thus classified as belonging to the topic of mountains, since there are more mountains than clouds in the digital image, and since there are no cars in the digital image. This type of prior art classifier, in other words, cannot assign an object to more than one topic. This type of prior art classifier also cannot determine that there is a topic to which the object belongs—sky—that is not present within the predefined set of topics.

In another type of prior art classifier, the object is determined as belonging to one or more topics of the predefined set of topics that are present within the object. In the example, the object is thus classified as belonging to the topic of mountains and the topic of clouds, and not to the topic of cars, which is not present in the digital image. However, this type of prior art classifier cannot indicate that the topic of mountains is the primary topic of the digital image and that the topic of clouds is a subordinate topic of the image—that is, that there are more mountains within the picture than clouds. In other words, this type of prior art classifier cannot determine the probability, or weight, with which the object belongs to each topic. Furthermore, this type of prior art classifier cannot indicate that there is another topic—sky—to which the object belongs and that is not present within the predefined set of topics.

In a third type of prior art classifier, the object is determined as belong to a topic that is not found within the predefined set of topics. In the example, the object is classified as belonging to an unknown topic, which may be considered the conjunction of clouds, mountains, and sky. However, this type of prior art classifier cannot determine that the unknown topic encompasses two existing topics in the predefined set of topics, specifically clouds and mountains, nor that these existing topics of clouds and mountains are present within the digital image. This type of prior art classifier also cannot determine that two existing topics in the predefined set of topics are present, but that the object includes another topic that is not found in the predefined set. Rather, this type of prior art classifier can only determine that the sum total of the object cannot be classified into any of the existing topics of the predefined set of topics.

A classification approach has been developed that overcomes these shortcomings. In the example, the inventive classifier determines that the object belongs to the topic of mountains and the topic of clouds, and that there is an additional topic that is present within the object but that is not present within the predefined set of topics. The inventive classifier is also able to assess the probability that the object belongs to each topic. That is, the inventive classifier is able to determine that there are more mountains than clouds in the digital image, and that there are more clouds than sky in the digital image.

As such, the inventive classifier is able to indicate that the primary topic of the object is mountains, that the subordinate topics are clouds, and that a topic—sky—not found in the predefined set of topics is present within the object. Furthermore, the inventive classification approach can make these determinations by analyzing a relative small number of samples from the object, instead of having to analyze the object in its entirety, as is common within prior art classifiers. In all these respects, the inventive classification approach is advantageous as compared to prior art classifiers.

FIG. 1 shows a method 100 of such a classification approach, according to a general embodiment of the disclosure. The parts of the method 100, as well as of other methods of embodiments of the disclosure, may be performed by a processor of a computing device. As such, the method 100 may be implemented as computer code stored on a computer-readable storage medium, like a hard disk drive, a semiconductor memory, or another type of computer-readable storage medium. The computer code is executed by a processor to perform the method 100.

A number of topics to which an object potentially belongs are received (102). The topics may be received in that they are initially defined or predefined, for instance. The topics are non-exhaustive, however, in that the object may belong to topics other than the topics that are received in part 102. Each topic is characterized by a probability distribution profile of a number of representative items. The probability distribution profile of a topic specifies the probability that each representative item in question belongs to the topic. The object also includes a number of items, which may be considered the vocabulary of the object. The items may be a set of words within a textual document object, a set of wavelet coefficients resulting from performing a discrete wavelet transform or other processing, such as feature extraction, on an image object, or other types of items.

Sample items are selected from the object (104), where the number of sample items selected is less than the total number of items of the object. The sample items are uniformly and randomly selected from the object. The probability that the object belongs to each topic is then determined (106). This determination is made using the sample items that have been selected, and the probability distribution profile of each topic. An exemplary approach to determining the probability that the object belongs to each topic is described later in the detailed description.

If the topics present within the object are all found within the topics received in part 102, then two conditions will be satisfied. The first condition is that the absolute value of the difference between a value of one and the sum of all the probabilities determined in part 108 will be less than a first threshold, such as, for example, one percent. Ideally, this difference is zero. The second condition is that all of the probabilities determined in part 108 will have values greater than a second threshold, such as −0.01. Ideally, all of the probabilities will have non-negative values. If either or both of these conditions are not satisfied, then this means that the topics received in part 102 may or does not encompass all the topics present within the object. These two conditions can be referred to generally as probability indicators of a new topic.

Therefore, where the absolute value of the difference between one and the sum of the probabilities is greater than a first threshold, or where at least one of the probabilities has a negative value less than a second threshold, the method 100 performs the following (110). First, it is concluded that at least some part of the object potentially, and indeed likely, also belongs to a new topic that is not currently part of the topics that were received in part 102 (112). Second, this new topic is selected and added to the list of topics that were received in part 102 (114). The method 100 then proceeds back to part 106 (116).

For example, a user may be provided with a list of the topics that were received in part 102, and instructed to examine the object to come up with a new topic that is not found within the list. The user may thus select such a new topic, which is added to the topics previously received in part 102. A probability distribution profile is created for this new topic, in a manner consistent with the process has been described in relation to part 102. The method 100 then redetermines the probability that the object belongs to each topic, including the new topic, in part 106, as indicated by arrow 116.

Once the absolute value of the difference between one and the sum of all the probabilities is less than the first threshold, and once all the probabilities have values greater than the second threshold, then the topics to which the object belongs and at what probabilities are output (118). The topics to which the object belongs are the topics for which non-zero and non-negative (i.e., positive) probabilities have been determined. The topic having the greatest probability is the primary topic of the object, and the topics having lesser probabilities are the secondary or subordinate topics of the object, in order of probability. In at least some cases, the probabilities for at least two of the topics will be ultimately determined in part 106 (i.e., after one or more iterations pursuant to part 110 and arrow 116) as non-zero for a given object, such that the given object is ultimately determined as belonging to more than one topic.

The topics to which the object belongs and their probabilities can be output in a number of different ways. For instance, the topics and their probabilities may be displayed on a display device, stored on a storage device, printed on a printing device, and/or communicated over a network by a networking device. As another example, the topics and their probabilities may be input to other software for additional processing. That the probabilities of the topics to which the object belongs are output can mean that these topics are provided in an ordered list, beginning with the primary topic to which the object belongs, and ending with the most secondary topic (to which the object has the lowest probability of belonging). Additionally or alternatively, the actual numeric values of the probabilities of the topics to which the object belongs can be output.

FIGS. 2A and 2B show a method 200 that is more detailed than but consistent with the method 100 of FIG. 1, according to a more specific embodiment of the disclosure. Parts 202, 208, 214, and 234 of the method 200 correspond to parts 102, 104, 110, and 118, respectively, of the method 100. Parts 204, 206, 210, and 212 can be considered as one implementation of part 106 of the method 100.

A number of topics to which an object potentially belongs are received as before, as well as a probability distribution profile for each topic (202). The object is referred to as A, and is made up of a set of items $I=\{item_1, item_2, \ldots, item_M\}$, which is also referred to as the vocabulary of the object A. The set of topics is referred to as $C=\{c_f\}$ for a total of k topics. A given topic $c_f$ is a class of objects characterized by a specific probability distribution on the set of items I from the vocabulary. It is noted that $\|I\|=M$ and that $\|C\|=k$. Generally, $M \gg k$; that is, the number of topics k is much smaller than the number of items M in the vocabulary.

The probability distribution profile of each topic $c_f$ is a probability distribution on the set of items from the vocabulary of a number of representative items that belong to the topic. In one embodiment, the probability distribution profile of each topic is constructed by first selecting raining sets of items that are purely representative of each topic $c_f$. The probability distribution profile $r_f$ for each topic is then determined as $r_f=(p(item_1|c_f), p(item_2|c_f), \ldots, p(item_M|c_f))^T$, where the vector is transposed from a row vector to a column vector as indicated by T, and $p(item_j|c_f)$ is the probability that $item_j$ is encompassed by topic $c_f$. The probability distribution profile $r_f$ is a column vector.

Next, a matrix of probabilities is constructed (204). Specifically, a matrix of probabilities W is formed using all the probability distribution profiles $r_f$ as its columns. The dimensions of the matrix W is M×k, and M (the number of items within the object) is much larger than k (the number of topics), or $M \gg k$; that is, there are many more items in the set of items I than there are topics in the set of topics C. The topics are presumed to be linearly independent, so that the columns in the matrix W are likewise linearly independent, and such that the matrix W has a full rank.

A left-inverse of the matrix of probabilities is then constructed (206). Specifically, the left-inverse W' of the matrix W is determined, such that $W'W=IdentityMatrix_k$, where $IdentityMatrix_k$ is a k×k identity matrix. In one embodiment, singular value decomposition (SVD) is employed to determine the matrix W'. In another embodiment, the matrix W' is the Kleinberg-Sandler left-inverse of the matrix W, which can be determined using a polynomial algorithmic approach. The Kleinberg-Sandler left-inverse of a matrix is determined as described in the technical article J. Kleinberg et al., "Using Mixture Models for Collaborative Filtering," which appeared in the Proceedings of the 36th ACM Symposium on the Theory of Computing, 2004.

Next, a sample size is determined (208). The sample size is selected to guarantee that the probability that the object belongs to each topic is with a desired accuracy, which is referred to as e. The sample size is referred to as s, and can be determined as $$s = \frac{k^3 \gamma^2}{e^2 d}.$$

In this equation, $\gamma$ is the largest absolute value of the matrix elements of the matrix W', and k is the total number of topics, as before. Furthermore e=1−d, where d is the probability that the accuracy e is achieved when determining the probability that the object belongs to each topic.

The sample size s represents the worst case scenario as to the number of samples of the items within the object A that have to be taken to guarantee a desired accuracy e when determining the probability that the object belongs to each topic. Therefore, in one embodiment, the sample size s may be reduced by some factor if desired. In either case, the sample size s is less than the total number of items M within I.

A number of sample items, equal to s, are then randomly selected from all the items of the object A to be classified, and a sparse vector g is constructed (210). The sparse vector g has a number of components, and has a length M in that it has M components. The sparse vector g is constructed such that each component g(f) is equal to the frequency of $item_f$ in the selected sample. If $item_f$ is not found within the selected sample items, then the component g(f) is equal to zero.

The sparse vector g is then multiplied by the matrix W' to yield a probability vector $x_A$ of the probability that the object A belongs to each topic $c_i$, or $x_A$=W'g (212). The probability vector $x_A$ has a length equal to k. The vector $x_A$ provides the probabilities that the object belongs to each topic, $x_1$, $x_2$, ..., $x_k$. The probabilities, or weights, $x_1$, $x_2$, ..., $x_k$, have accuracy e at probability 1−d.

The result of part 212 is one of three possibilities. The first possibility is that the object belongs to just one topic, where the corresponding weight, or probability, for this topic is one. The second possibility is that all the weights are non-negative, and their sum is equal to one within a given error threshold. In this situation, the classification topic with the largest weight is the primary topic for the object, the classification topic with the next largest weight is the secondary topic for the object, and so on. The third possibility is that one or more of the weights are negative (within a specific threshold), and/or the sum of all the weights is not equal to one within the given threshold. In this situation, the object may belong to a new topic.

Therefore, the following is performed if the sum of all the probabilities $$\sum_{f=1}^{k} x_f$$

is not equal to one (i.e., 1.0) within a first error threshold, or where any of the probabilities is negative below a second error threshold (214). The first condition may be specified as $$\sum_{f=1}^{k} x_f < 1-h \text{ or } \sum_{f=1}^{k} x_f > 1+h,$$

or alternatively $$\left| \sum_{f=1}^{k} x_f - 1 \right| > h,$$

where h is the first error threshold and is a small positive number. The second condition may be specified as $|x_z|$>H and $x_z$<0, or alternatively $x_z$<−H, where H is the second error threshold, and is also a small positive number. These two conditions are restatements of the probability indicators noted above in part 110, but in different form, and the first and the second error thresholds are the first and the second thresholds noted above. First, a counter is incremented by one (216). The counter is originally set to zero when the method 200 is performed for the first time. The counter corresponds to the number of times that the sum of the probabilities is not equal to one within the error threshold or that not all of the probabilities are non-negative.

If the counter is less than a predetermined threshold, then the following is performed (218). New sample items are selected from the items of the object and the sparse vector is reconstructed (220). The method 200 then proceeds back to part 212 (222).

By comparison, if the counter is equal to the predetermined threshold, then the following is performed (224). It is concluded that the object potentially, and indeed likely, also belongs to a new topic that is not currently part of the topics that were previously received (226). Therefore, this new topic is selected and added to the topics that were received (228). The counter is reset (230), and the method 200 proceeds back to part 204 (232).

Once the sum of all the probabilities determined is equal to one (i.e., 1.0) within the predetermined error threshold, and once all these probabilities are non-negative (i.e., equal to or greater than zero), then the topics to which the object belongs and at what probabilities are output (234), as before. The topics to which the object belongs are the topics for which non-zero and non-negative (i.e., positive) probabilities have been determined. The topic having the greatest probability is the primary topic of the object, and the topics having lesser probabilities are the secondary or subordinate topics of the object, in order of probability. Furthermore, some of the topics may be of equal probability. In general, the calculated probability is proportional to the area within the object occupied by the topic.

Figure 3:
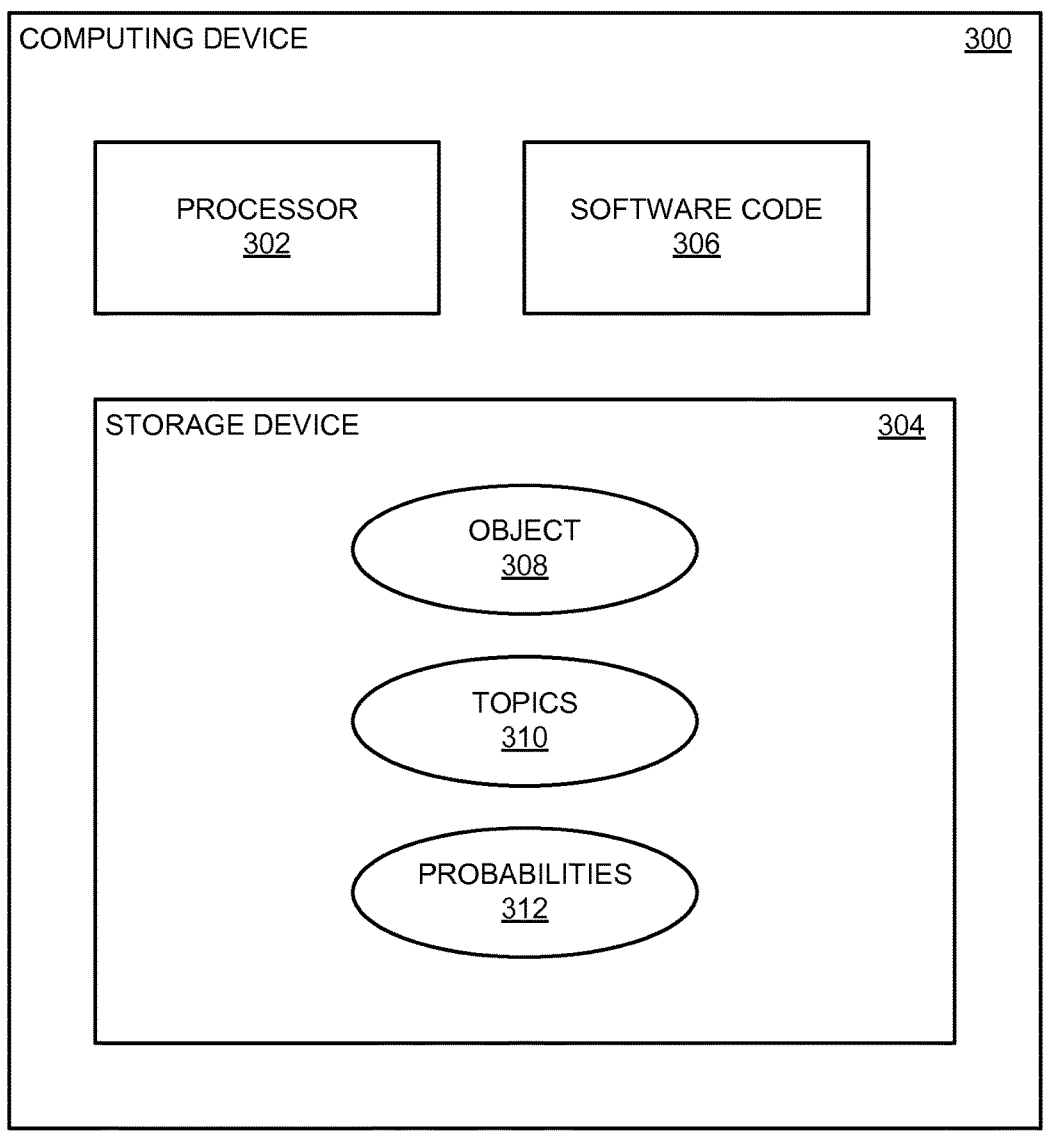
FIG. 3 is a diagram of a computing device, according to an embodiment of the present disclosure.

In conclusion, FIG. 3 shows a rudimentary computing device 300, according to an embodiment of the disclosure. The computing device 300 includes hardware, specifically a processor 302 and a storage device 304, as well as software, specifically software code 306. The computing device 300 can also include other hardware and/or software, in addition to the hardware and the software depicted in FIG. 3.

The storage device 304 is a volatile storage device, such as dynamic random access memory (DRAM), or a non-volatile storage device, such as a hard disk drive. The storage device 304 stores data representing an object 308, data representing topics 310 to which the object can potentially belong, and data representing probabilities 312 with which the object 308 belongs to the topics 310. The probabilities 312 may also be referred to as weights, or confidence values.

The software code 306 can be stored on the same storage device 304 as the data representing the object 308, the topics 310, and the probabilities 312 are, or on a different storage device. The software code 306 is executed by the processor 302. Execution of the software code 306 by the processor 302 determines the probability 312 that the object 308 belongs to each topic 310. For instance, the software code 306 may perform the method 100 of the FIG. 1, and/or the method 200 of FIGS. 2A and 2B.

We claim:

1. A method comprising:
   receiving a plurality of topics to which an object potentially belongs, each topic characterized by a probability distribution profile of a plurality of representative items that belong to the topic;
   selecting, by a processor of a computing device, a plurality of sample items from the object less than a total number of a plurality of items of the object;
   determining, by the processor, a probability that the object belongs to each topic using the probability distribution profile characterizing each topic and the sample items selected from the object; and,
   outputting at least the topics to which the object belongs with non-zero probability.

2. The method of claim 1, further comprising:
   where an absolute value of a difference between a value of one and a sum of the probabilities is greater than a first threshold, or where at least one of the probabilities has a negative value less than a second threshold,
      concluding that the object potentially belongs to a new topic that is not currently part of the plurality of topics that have been received;
      adding the new topic to the plurality of topics; and,
      determining the probability that the object belongs to each topic, including the new topic.

3. The method of claim 1, further comprising, after determining the probability that the object belongs to each topic:
   where an absolute value of a difference between a value of one and a sum of the probabilities is greater than a first threshold, or where at least one of the probabilities has a negative value less than a second threshold,
      increasing a counter, the counter corresponding to a number of times the absolute value is greater than the first threshold or at least one of the probabilities has a negative value less than the second threshold;
   where the counter is less than a third threshold,
      selecting new sample items from the items of the object to increase the number of the sample items used to determine the probability that the object belongs to each topic;
      using the new items to redetermine the probability that the object belongs to each topic;
   where the counter is equal to the third threshold,
      concluding that the object potentially belongs to a new topic that is not currently part of the plurality of topics that have been received;
      adding the new topic to the plurality of topics; and,
      determining the probability that the object belongs to each topic, including the new topic.

4. The method of claim 1, further comprising determining a sample size guaranteeing that the probability that the object belongs to each topic is determined with a desired accuracy,
   wherein the sample items selected from the object are equal in number to the sample size.

5. The method of claim 1, wherein the samples are uniformly and randomly selected from the object.

6. The method of claim 5, further comprising constructing a sparse vector having a plurality of components, each component of the sparse vector corresponding to a given item, where a value of the component is equal to a frequency of the given item within the samples selected from the object if the given item is found within the samples, and is otherwise equal to zero,
   wherein determining the probability that the object belongs to each topic comprises multiplying the sparse vector by a matrix of probabilities to yield a probability vector comprising the probability that the object belongs to each topic.

7. The method of claim 6, wherein the matrix of probabilities is a first matrix of probabilities,
   and wherein determining the probability that the object belongs to each topic comprises determining the first matrix of probabilities by:
      constructing a second matrix of probabilities having a plurality of columns corresponding to the probability distribution profiles for the topics, the columns being linearly independent;
      constructing a left-inverse of the second matrix of probabilities such that the second matrix of probabilities times the left-inverse of the second matrix of probabilities is equal to an identity matrix; and,
      setting the first matrix of probabilities to the left-inverse of the second matrix of probabilities.

8. The method of claim 1, wherein each of at least one given object of a plurality of given objects is determined as having non-zero probabilities for at least two of the topics.

9. A computing device comprising:
   a processor;
   a storage device to store data representing an object and data representing a plurality of topics to which the object potentially belongs, each topic characterized by a probability distribution profile of a plurality of representative items that belong to the topic; and,
   software code executed by the processor to select a plurality of sample items from the object less than a total number of a plurality of items of the object, and to determine a probability that the object belongs to each topic using the probability distribution profile characterizing each topic and the sample items selected from the object.

10. The computing device of claim 9, wherein the software code is further to:
    where an absolute value of a difference between a value of one and a sum of the probabilities is greater than a first threshold, or where at least one of the probabilities has a negative value less than a second threshold,
       conclude that the object potentially belongs to a new topic that is not currently part of the plurality of topics;
       add the new topic to the plurality of topics; and,
       redetermine the probability that the object belongs to each topic.

11. The computing device of claim 9, wherein the software code is further to:
    where an absolute value of a difference between a value of one and a sum of the probabilities is greater than a first threshold, or where at least one of the probabilities has a negative value less than a second threshold,
       increase a counter, the counter corresponding to a number of times the absolute value is greater than the first threshold or at least one of the probabilities has a negative value less than the second threshold;
where the counter is less than a third threshold,
  select new sample items from the items of the object to increase the number of the sample items used to determine the probability that the object belongs to each topic;
  use the new items to redetermine the probability that the object belongs to each topic;
where the counter is equal to the third threshold,
  conclude that the object potentially belongs to a new topic that is not currently part of the plurality of topics that have been received;
  add the new topic to the plurality of topics; and,
  determine the probability that the object belongs to each topic, including the new topic.

12. The computing device of claim 9, wherein the software code is further to determine a sample size guaranteeing that the probability that the object belongs to each topic is determined with a desired accuracy,
wherein the sample items selected from the object are equal in number to the sample size.

13. The computing device of claim 9, wherein the samples are uniformly and randomly selected from the object.

14. The computing device of claim 9, wherein each of at least one given object of a plurality of given objects is determined as having non-zero probabilities for at least two of the topics.

15. A non-transitory computer-readable medium having computer code stored thereon, wherein execution of the computer code by a processor causes a method to be performed, the method comprising:
receiving a plurality of topics to which an object potentially belongs, each topic characterized by a probability distribution profile of a plurality of representative items that belong to the topic;
selecting, by a processor of the computing device, a plurality of sample items from the object less than a total number of a plurality of items of the object; and,
determining, by the processor, a probability that the object belongs to each topic using the probability distribution profile characterizing each topic and the sample items selected from the object.

16. The non-transitory computer-readable medium of claim 15, wherein the method further comprises:
where an absolute value of a difference between a value of one and a sum of the probabilities is greater than a first threshold, or where at least one of the probabilities has a negative value less than a second threshold,
  increase a counter, the counter corresponding to a number of times the absolute value is greater than the first threshold or at least one of the probabilities has a negative value less than the second threshold;
where the counter is less than a third threshold,
  select new sample items from the items of the object to increase the number of the sample items used to determine the probability that the object belongs to each topic;
  use the new items to redetermine the probability that the object belongs to each topic;
where the counter is equal to the third threshold,
  conclude that the object potentially belongs to a new topic that is not currently part of the plurality of topics that have been received;
  add the new topic to the plurality of topics; and,
  determine the probability that the object belongs to each topic, including the new topic.

17. The non-transitory computer-readable medium of claim 15, wherein the method further comprises determining a sample size guaranteeing that the probability that the object belongs to each topic is determined with a desired accuracy,
wherein the sample items selected from the object are equal in number to the sample size.

18. The non-transitory computer-readable medium of claim 15, wherein the samples are uniformly and randomly selected from the object.

19. The non-transitory computer-readable medium of claim 15, wherein each of at least one given object of a plurality of given objects is determined as having non-zero probabilities for at least two of the topics.

* * * * *